Jan. 24, 1961   F. E. PANES   2,969,157
TRACKS FOR LOADING AND UNLOADING TRUCKS
Filed Feb. 12, 1958   2 Sheets-Sheet 1

Inventor
FRANK E. PANES
by: George... 
Attorney

Jan. 24, 1961 F. E. PANES 2,969,157
TRACKS FOR LOADING AND UNLOADING TRUCKS
Filed Feb. 12, 1958 2 Sheets-Sheet 2

Inventor
FRANK E. PANES
by: *George L. Picker*
Attorney

United States Patent Office

2,969,157
Patented Jan. 24, 1961

2,969,157

TRACKS FOR LOADING AND UNLOADING TRUCKS

Frank E. Panes, Box 507 John St., Cooksville, Ontario, Canada

Filed Feb. 12, 1958, Ser. No. 714,777

1 Claim. (Cl. 214—75)

This invention relates to improvements in loading and unloading hoists for trucks of the kind which are mounted on tracks on the truck platform for loading and unloading cement blocks, bricks and the like to and from the truck and in particular to a track extension so that the hoist can be moved rearwardly beyond the rear end of the truck to a position above the ground from which the load is to be lifted onto the truck or over the site onto which the load is to be deposited.

One of the objects of the invention is to provide track extensions which can be quickly mounted in place on the rear of the truck platform when the hoisting device is to be used and removed when the loading or unloading respectively is completed.

It has heretofore been proposed to provide extension tracks hinged to the rear end of the truck platform so that, when not in use, they can be folded against the tailboard of the truck and when it is desired to use the extension they can be swung outwardly into alignment with the tracks. Such constructions required the most outwardly end (free end) to be supported by a jack.

One disadvantage of the track arrangement heretofore employed is that they are easily damaged when it is necessary to push the truck by means of a bulldozer. Such action is frequently necessary since the truck load consisting of brick or tile has to be transported by the truck into rough and frequently muddy terrain.

A further disadvantage of the track arrangement hereto in use is that the outside ends (free ends) of the tracks had to be supported by a means of jacks because of the inherent weakness of hinges. Under these circumstances each time the truck is moved when unloading or loading the jacks have to be removed.

A further disadvantage is that the tracks have to be opened to their extended position when backing into place for loading and, in that position, may be damaged or may disturb the load to be picked up.

Therefore another object of the invention is to provide track extensions which are not subject to the foregoing objections and which will leave the tailboard of the platform clear and unobstructed.

A further advantage of the invention is that the truck can be backed into position for loading and then when in that position the tracks may be mounted in place.

A further advantage of the present invention is that the outermost end (free end) of the tracks require no supporting jacks and consequently the truck may be moved during loading and unloading without difficulty.

For an understanding of the objects and advantages of the present invention and the manner in which it is constructed and used reference is to be had to the following description and the accompanying drawings which illustrate one embodiment of the same.

Figure 1:
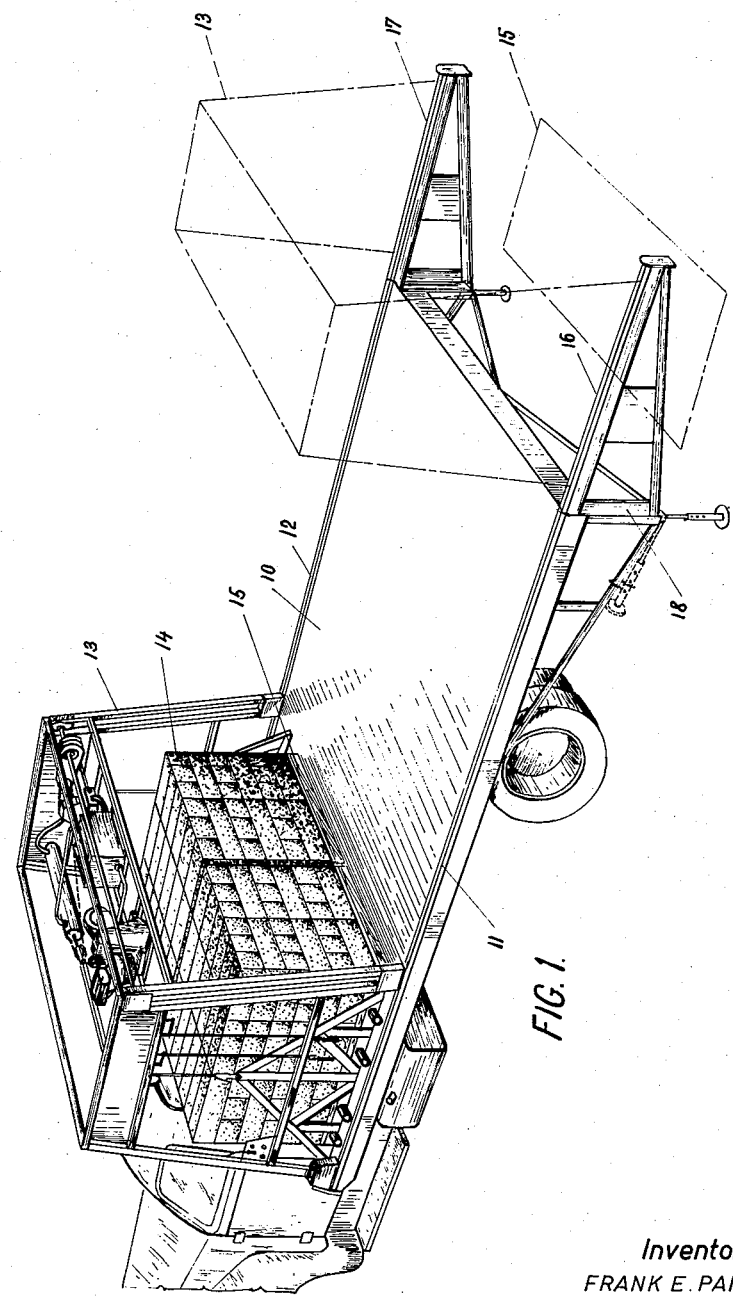
Figure 1 is a perspective view of a truck employing the track extensions of the present invention.

The truck shown in the drawings includes a frame 9 on which is mounted a truck platform 10, rails or tracks 11 extending along each side of the platform 12, the tracks being in the form of an inverted V. Mounted on the tracks is a power driven loading and unloading hoist 13, which is shown in conjunction with a pile of brick or tile indicated by the numeral 14 which are piled on a pallet 15. Since the hoist forms no part of the present invention and since its construction and operation is well known, it is not necessary to further describe the same. It is however mentioned that any of the known hoists may be used, with such modifications as may be necessary to adapt the same for operation on a truck.

Mounted on the rear end of the truck platform is a pair of extension tracks 16, 17 which are constructed so that they can be removably attached to the rear of the truck platform in alignment with the tracks 11, 12 respectively. Since both extension tracks are similar in construction and are mounted in the same manner, it is only necessary to describe the construction and mounting of one track and this will be done in relation to the track 16.

The track 16 is formed as a unit by means of a downwardly extending bracket 18 the upper end of which is connected to the track 16 and the lower end is rigidily held in position by a truss 19 one end of which is connected to the lower end of the bracket 18 and the other to the outer or right hand end of the track 16. Further bracing may be obtained by means of a cross bar 20. As will be seen, this construction forms a triangular shaped track extension. The bracket 18 is formed with a guideway 21 which is slotted at 22 facing the rear platform of the truck.

The means for mounting the track extension 16 on the rear end of the platform consists of a pair of mounting tracks 23 which are permanently mounted vertically on the rear end of the platform in spaced apart relationship, one adjacent each side of the truck in vertical alignment with the tracks 11, 12 respectively. The mounting tracks 23 may be attached to the rear end o the truck by means of welding or in any of the othe commonly used means therefor. The tracks 23 enter th guideway 21 when the extension is mounted in position.

When the extension tracks 16 are not required for use they are stored in some convenient place on the truck When it is desired to load or unload materials to an from the truck by means of the hoisting mechanism it a very simple matter to mount the track extensions c the rear end of the truck platform.

Figure 2:
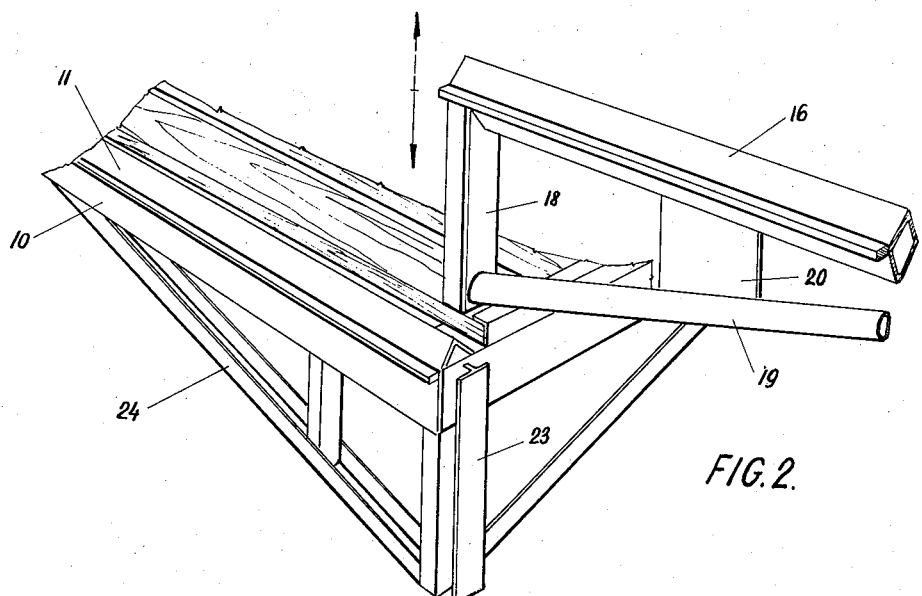
Figure 2 is a fragmentary perspective view of a portion of the rear end of the truck platform, on an enlarged scale, shown in Figure 1 to illustrate the track extension and the means by which it is mounted on the rear end of the truck platform.
Figure 3:
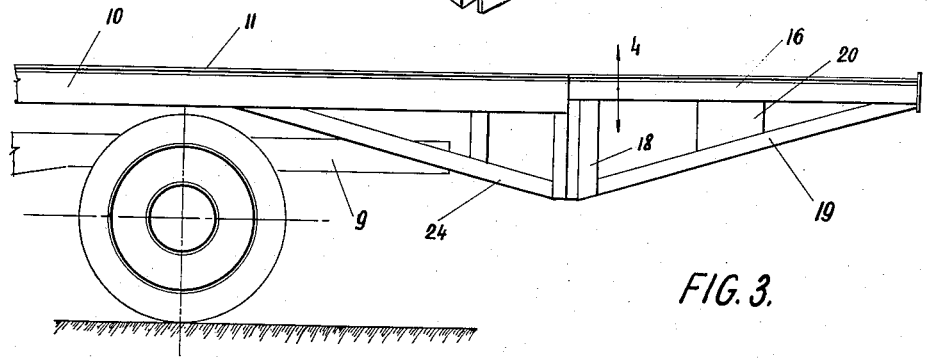
Figure 3 is a fragmentary side elevation, on a larger scale than Figure 1, of the rear end of the truck shown in Figure 1.
Figure 4:
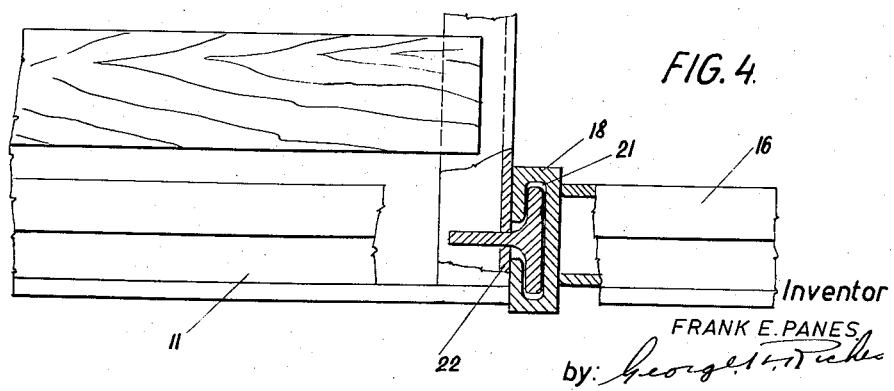
Figure 4 is a plan view of Figure 3 with the platform and bracket cut away on the line 4—4 of Figure 3.

In the position shown in Figure 2, the extension trac and its related parts are being lowered into position.

It will be seen that as the bracket 18 is lowered, tl track 23 will enter the guideway 21, the upper end which is closed by the left hand end of the track 16 ove hanging the top end of the bracket 23.

It will be seen that, with this construction, when t hoist moves out over the extension rails the weight of t hoist and its load is evenly distributed along the brac 18 and the bracket 23, the weight being carried back the platform on the truss 24. The extension tra always retain their correct position relative to the fi: tracks and require no support at the right hand end.

As soon as the loading or unloading is completed, extension tracks are removed and stored in their place on the truck.

The embodiments of the invention in which an exclusive property or privilege is claimed are defined as follows:

In a truck having a load carrying platform, a pair of fixed tracks secured along opposite edges of the platform and a pair of extension tracks, means for detachably mounting each track on the rear end of said platform as an extension of one of said fixed tracks, said means comprising a substantially long mounting bracket having its upper end fastened to the rear end of the platform in vertical alignment with one of said fixed tracks, a support truss connecting the lower end of the mounting bracket to said platform at load carrying positions, each extension track comprising a horizontal track forming member, a substantially long coupling bracket member having one end permanently secured to one end of said track-forming member, a load carrying strut interconnecting the other ends of said coupling bracket and track-forming members, said mounting bracket and coupling bracket having complemental inter-engaging parts whereby said track can be mounted on the rear of said platform.

References Cited in the file of this patent

UNITED STATES PATENTS

| | | |
|---|---|---|
| 771,716 | Conrad | Oct. 4, 1904 |
| 837,221 | Hall | Nov. 27, 1906 |
| 2,746,619 | Kuhlenschmidt et al. | May 22, 1956 |
| 2,812,868 | Crile | Nov. 12, 1957 |